US009118505B2

(12) United States Patent
Hungerford et al.

(10) Patent No.: US 9,118,505 B2
(45) Date of Patent: Aug. 25, 2015

(54) SYSTEM AND METHOD FOR CONTROLLING UPDATES ON A MOBILE DEVICE

(75) Inventors: Sean Hungerford, Kitchener (CA); Thomas P. Murphy, Ottawa (CA); Rebecca Lynne Young, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 382 days.

(21) Appl. No.: 12/940,596

(22) Filed: Nov. 5, 2010

(65) Prior Publication Data

US 2012/0117556 A1 May 10, 2012

(51) Int. Cl.
G06F 9/44 (2006.01)
H04L 12/58 (2006.01)
G06F 3/048 (2013.01)
G06F 9/445 (2006.01)

(52) U.S. Cl.
CPC .............. H04L 12/585 (2013.01); G06F 3/048 (2013.01); G06F 8/65 (2013.01); H04L 51/12 (2013.01)

(58) Field of Classification Search
CPC ................ G06F 3/1224–3/1226; G06F 3/123; G06F 8/65–8/70; G06F 3/048
USPC ............ 717/168–178; 709/201–247; 715/203
See application file for complete search history.

(56) References Cited

U.S. PATENT DOCUMENTS

| 6,353,926 | B1 * | 3/2002 | Parthesarathy et al. ....... 717/170 |
| 6,480,885 | B1 * | 11/2002 | Olivier ......................... 709/207 |
| 6,560,632 | B1 * | 5/2003 | Chess et al. .................... 709/201 |
| 7,140,536 | B2 * | 11/2006 | Barabe et al. .................. 235/375 |
| 7,606,772 | B2 | 10/2009 | Flinn et al. |
| 7,610,051 | B2 * | 10/2009 | Dunko et al. ............... 455/456.1 |
| 7,620,948 | B1 * | 11/2009 | Rowe et al. .................... 717/171 |
| 7,636,779 | B2 | 12/2009 | Hayashi et al. |
| 7,774,356 | B2 * | 8/2010 | Cui .............................. 707/769 |
| 7,970,827 | B1 * | 6/2011 | Cumberbatch et al. ....... 709/204 |
| 7,987,444 | B2 * | 7/2011 | Fuller et al. ................... 717/105 |

(Continued)

FOREIGN PATENT DOCUMENTS

| EP | 1762968 A1 | 3/2007 |
| EP | 2071442 A2 | 6/2009 |

OTHER PUBLICATIONS

Temporal Coordination through Genres and Genre Systems—Hyun-Gyung Im, JoAnne Yates, Wanda Orlikowski—Massachusetts Institute of Technology Cambridge, MA—seeit.mit.edu—Jun. 7, 2004.*

(Continued)

Primary Examiner — Lewis A Bullock, Jr.
Assistant Examiner — Francisco Aponte
(74) Attorney, Agent, or Firm — Jeffrey Giunta; Fleit Gibbons Gutman Bongini & Bianco P.L.

(57) ABSTRACT

A system and method are provided to organize updates on a mobile device. The organization of the updates can be controlled according to something detectable on the mobile device which can be correlated to something detectable in the updates. For example, updates to be displayed on the mobile device can be organized based on context provided by the mobile device, such that more relevant updates are distinguishable from those that may be less relevant. In this way, all updates are accessible to the user, but those that are deemed to be particularly relevant may be more visible and more easily accessed to avoid the need to sort through or scroll through large lists of new updates.

19 Claims, 12 Drawing Sheets

(56) References Cited

U.S. PATENT DOCUMENTS

| | | | |
|---|---|---|---|
| 8,014,943 B2* | 9/2011 | Jakobson | 701/439 |
| 8,108,501 B2* | 1/2012 | Birnie et al. | 709/223 |
| 8,315,791 B2* | 11/2012 | Bales et al. | 701/301 |
| 8,365,162 B2* | 1/2013 | Rauma | 717/173 |
| 8,572,094 B2* | 10/2013 | Luo et al. | 707/748 |
| 2005/0210459 A1* | 9/2005 | Henderson et al. | 717/168 |
| 2005/0221821 A1 | 10/2005 | Sokola et al. | |
| 2006/0209690 A1 | 9/2006 | Brooke | |
| 2007/0060099 A1 | 3/2007 | Ramer et al. | |
| 2007/0143390 A1* | 6/2007 | Giambalvo et al. | 709/200 |
| 2007/0156384 A1 | 7/2007 | Plunkett | |
| 2007/0168216 A1* | 7/2007 | Lemelson | 705/1 |
| 2007/0214097 A1 | 9/2007 | Parsons et al. | |
| 2008/0040673 A1* | 2/2008 | Zuckerberg et al. | 715/745 |
| 2008/0070697 A1* | 3/2008 | Robinson et al. | 463/42 |
| 2008/0104225 A1* | 5/2008 | Zhang et al. | 709/224 |
| 2008/0163068 A1* | 7/2008 | Gorzela | 715/738 |
| 2008/0201702 A1* | 8/2008 | Bunn | 717/171 |
| 2008/0222625 A1* | 9/2008 | Goldfarb et al. | 717/168 |
| 2008/0270560 A1* | 10/2008 | Tysowski et al. | 709/207 |
| 2008/0294663 A1* | 11/2008 | Heinley et al. | 707/100 |
| 2009/0005021 A1 | 1/2009 | Forstall et al. | |
| 2009/0019004 A1* | 1/2009 | Abhyanker | 707/3 |
| 2009/0063983 A1* | 3/2009 | Amidon et al. | 715/733 |
| 2009/0125602 A1* | 5/2009 | Bhatia et al. | 709/207 |
| 2009/0234945 A1 | 9/2009 | Chande et al. | |
| 2009/0249321 A1* | 10/2009 | Mandyam et al. | 717/171 |
| 2009/0287687 A1 | 11/2009 | Martire et al. | |
| 2009/0298480 A1 | 12/2009 | Khambete et al. | |
| 2010/0058313 A1* | 3/2010 | Hansmann et al. | 717/168 |
| 2010/0105440 A1* | 4/2010 | Kruzeniski et al. | 455/566 |
| 2011/0029636 A1* | 2/2011 | Smyth et al. | 709/217 |
| 2011/0067021 A1* | 3/2011 | Lee | 717/171 |
| 2011/0078675 A1* | 3/2011 | Van Camp et al. | 717/170 |
| 2011/0197185 A1* | 8/2011 | Hobbet et al. | 717/168 |
| 2011/0202603 A1* | 8/2011 | Mate et al. | 709/205 |
| 2011/0321029 A1* | 12/2011 | Kern et al. | 717/170 |
| 2012/0084766 A1* | 4/2012 | Shanmugam et al. | 717/173 |
| 2012/0210310 A1* | 8/2012 | Cooley et al. | 717/168 |

OTHER PUBLICATIONS

Petit, Sebastian; Search Report from corresponding European Application No. 10190178.3; search completed Mar. 11, 2011.

Excerpt from "Match2Blue—Location Based Social Network"; http://www.match2blue.com/cms/; online at least as early as May 26, 2009; retrieved from internet at least as early as Dec. 14, 2010.

Excerpt from "Microsoft Vine—Location Based Emergency Social Network"; http://www.vine.net/default.aspx/; online at least as early as May 9, 2009; retrieved from internet at least as early as Dec. 14, 2010.

Excerpt from "LightPole—Location Based Social Networking—Local Recommendations"; http://www.lightpole.net; online at least as early as Dec. 20, 2008; retrieved from internet at least as early as Dec. 14, 2010.

LifeInPockets® GPS Mobile Application & Services—Your life in your pocket; publication date unknown; http://mobile.roadcomm.com/index.html; RoadComm, Inc.

Ankolekar, A. et al.; "Friendlee: a Mobile Application for Your Social Life"; in MobileHCI '09: Proceedings of the 11th International Conference on Human-Computer Interaction with Mobile Devices and Services; Sep. 2009; pp. 1 to 4.

* cited by examiner

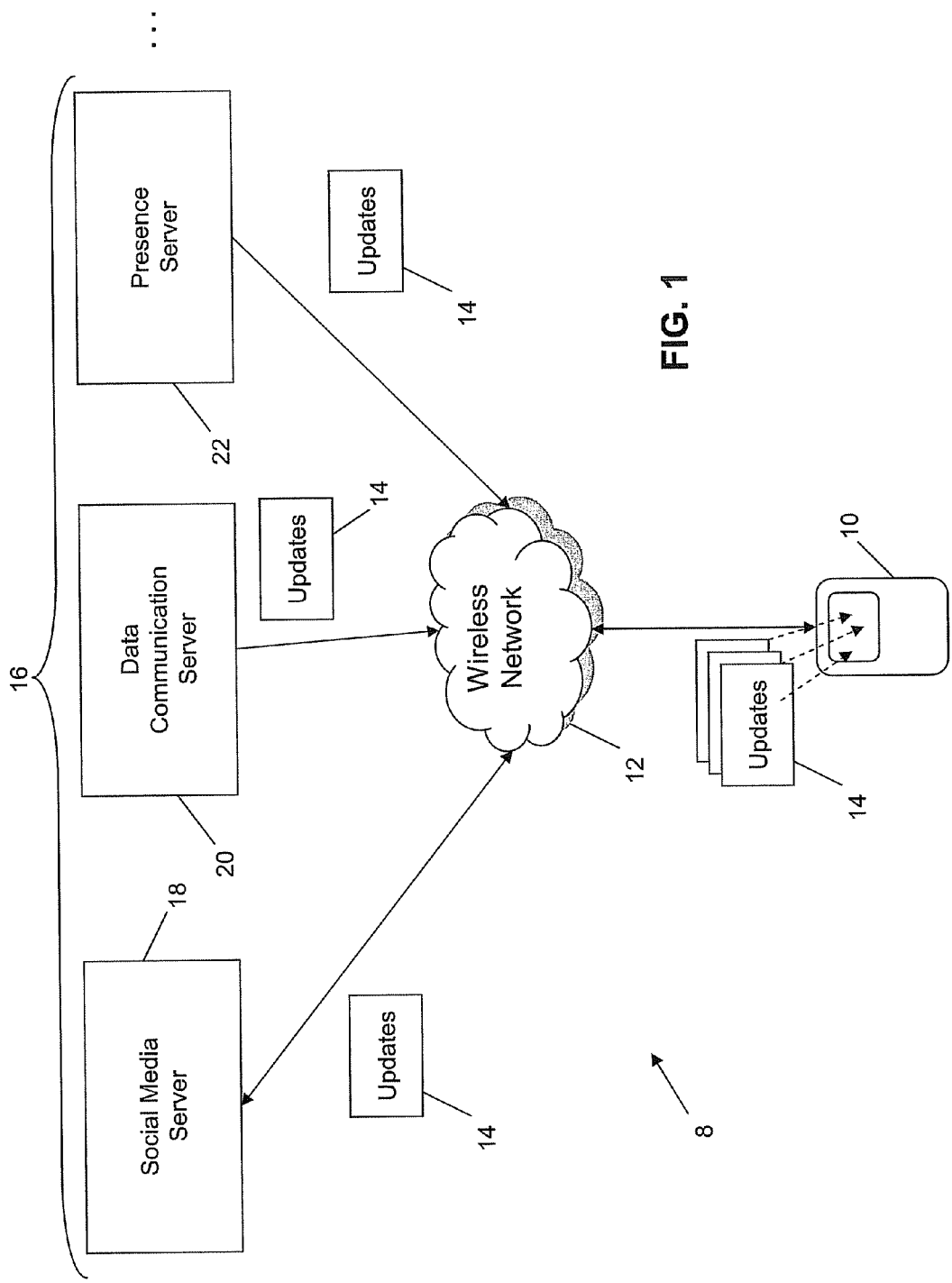

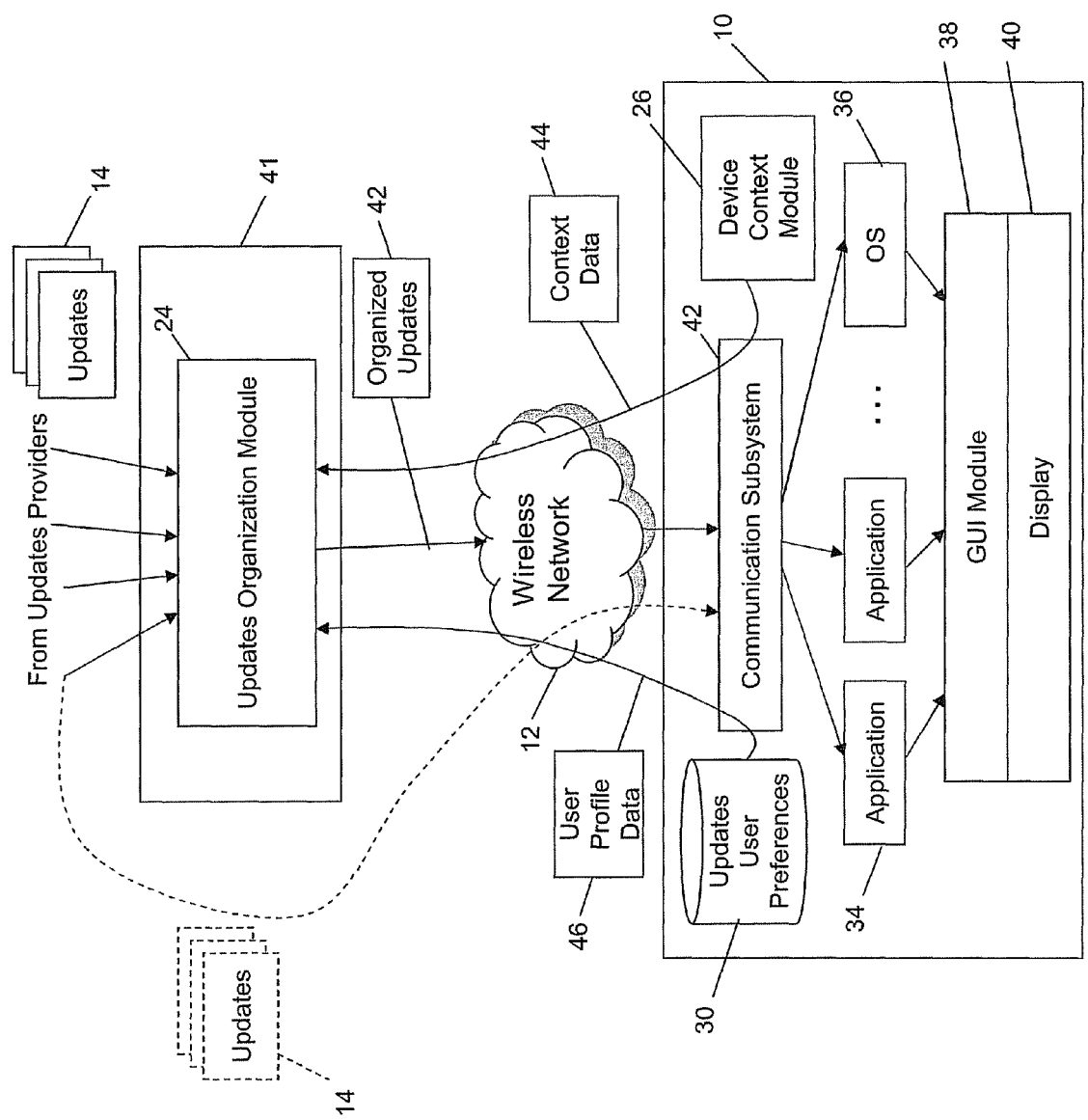

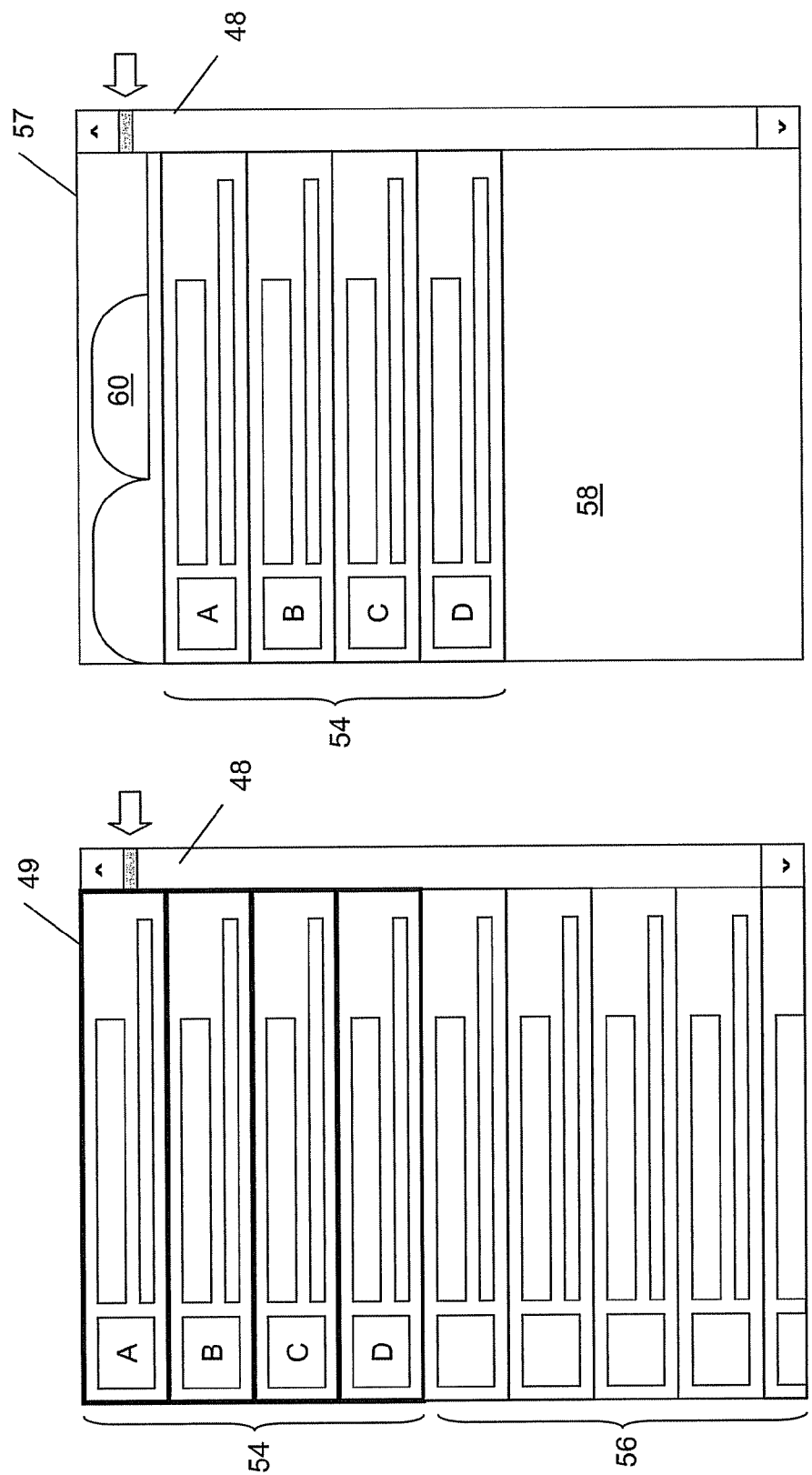

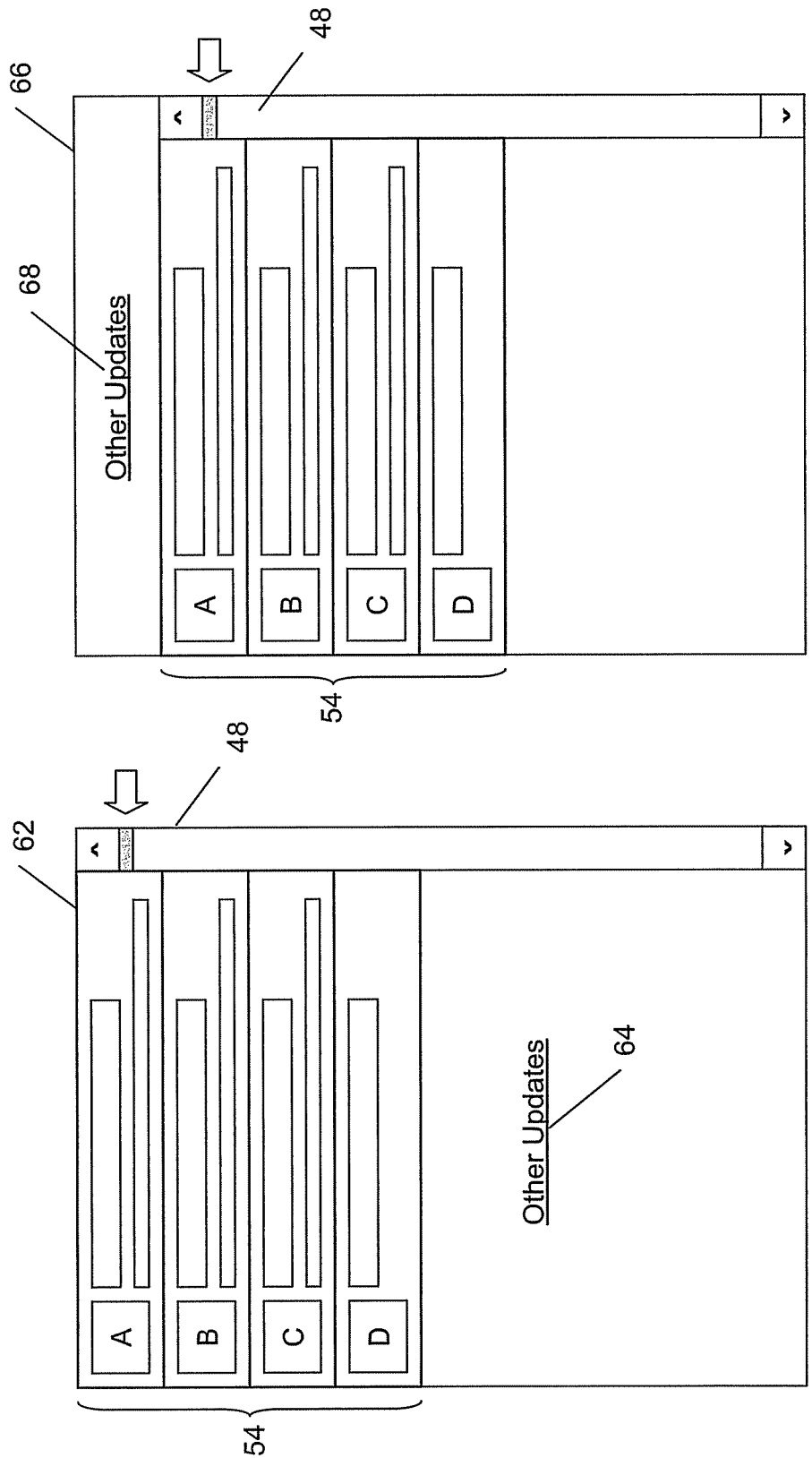

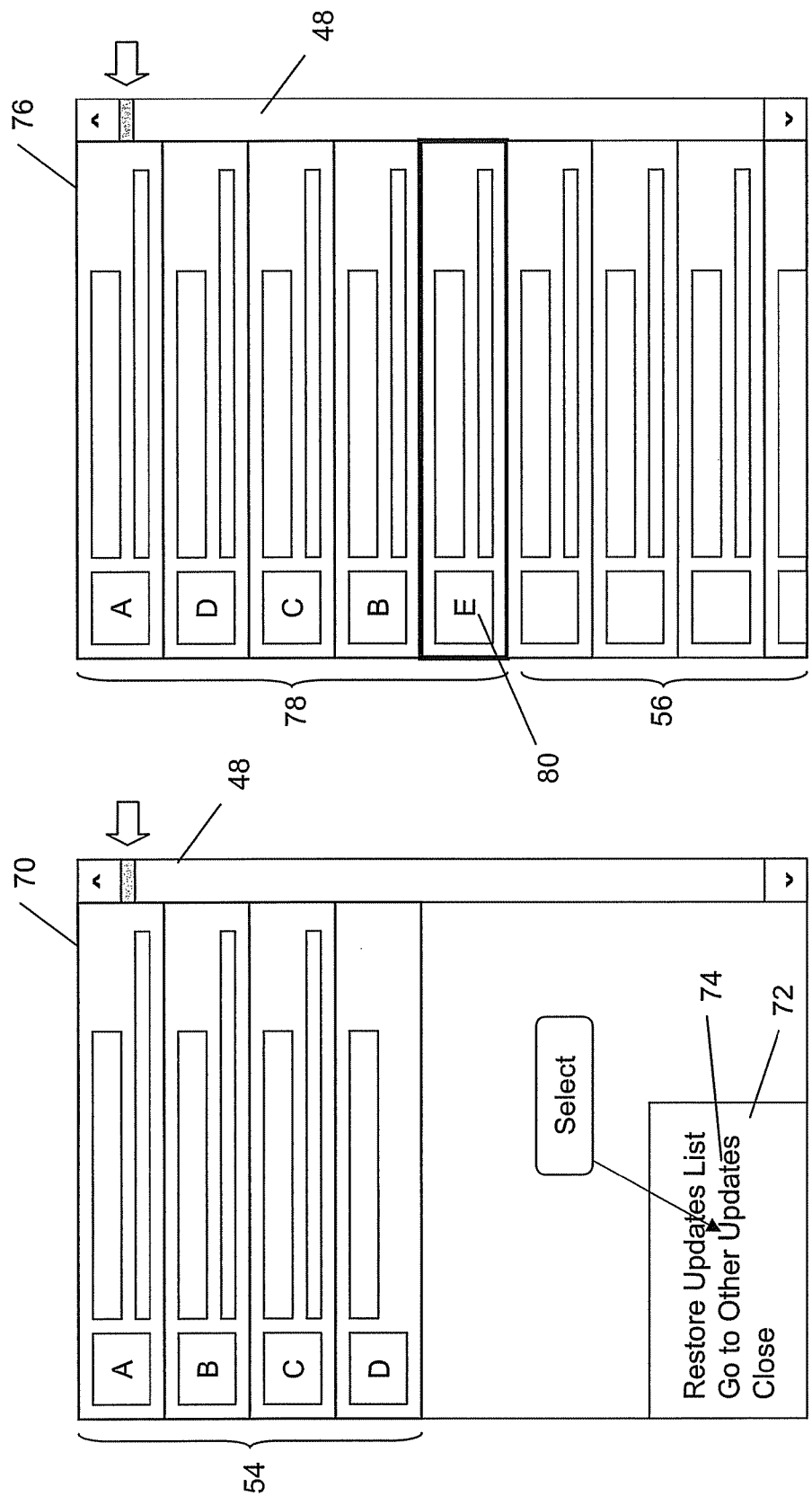

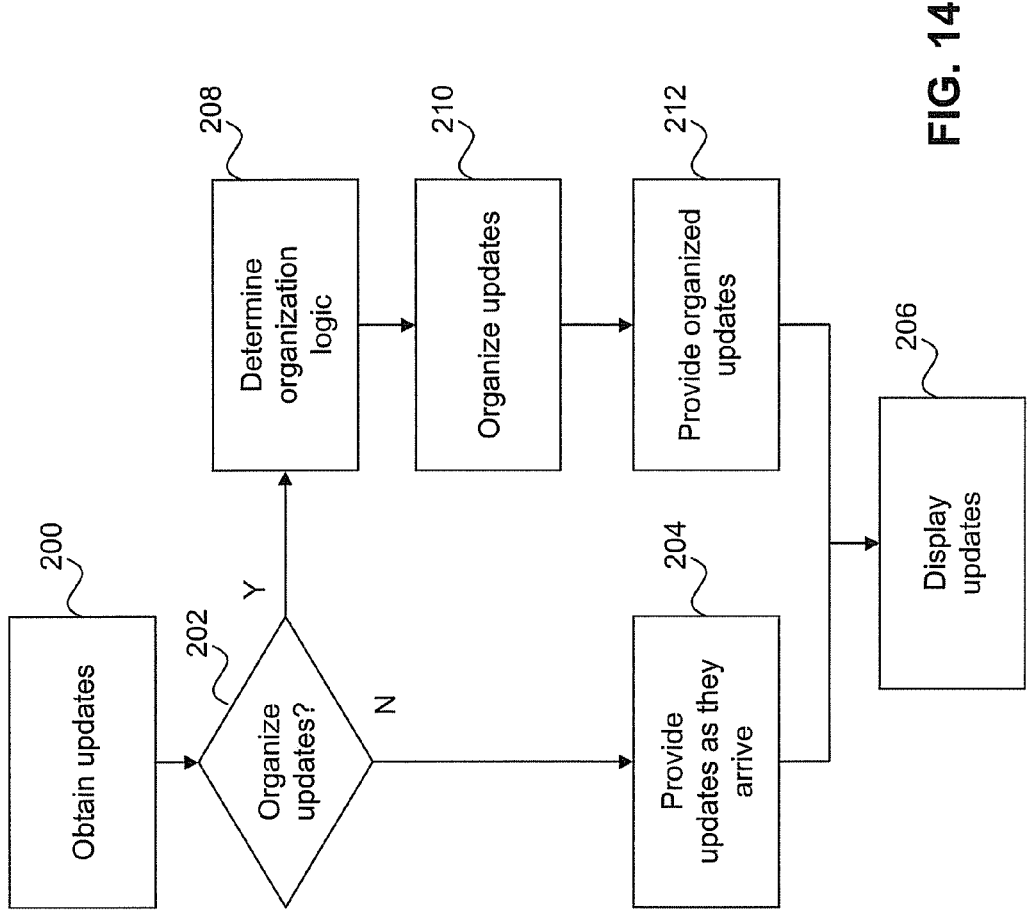

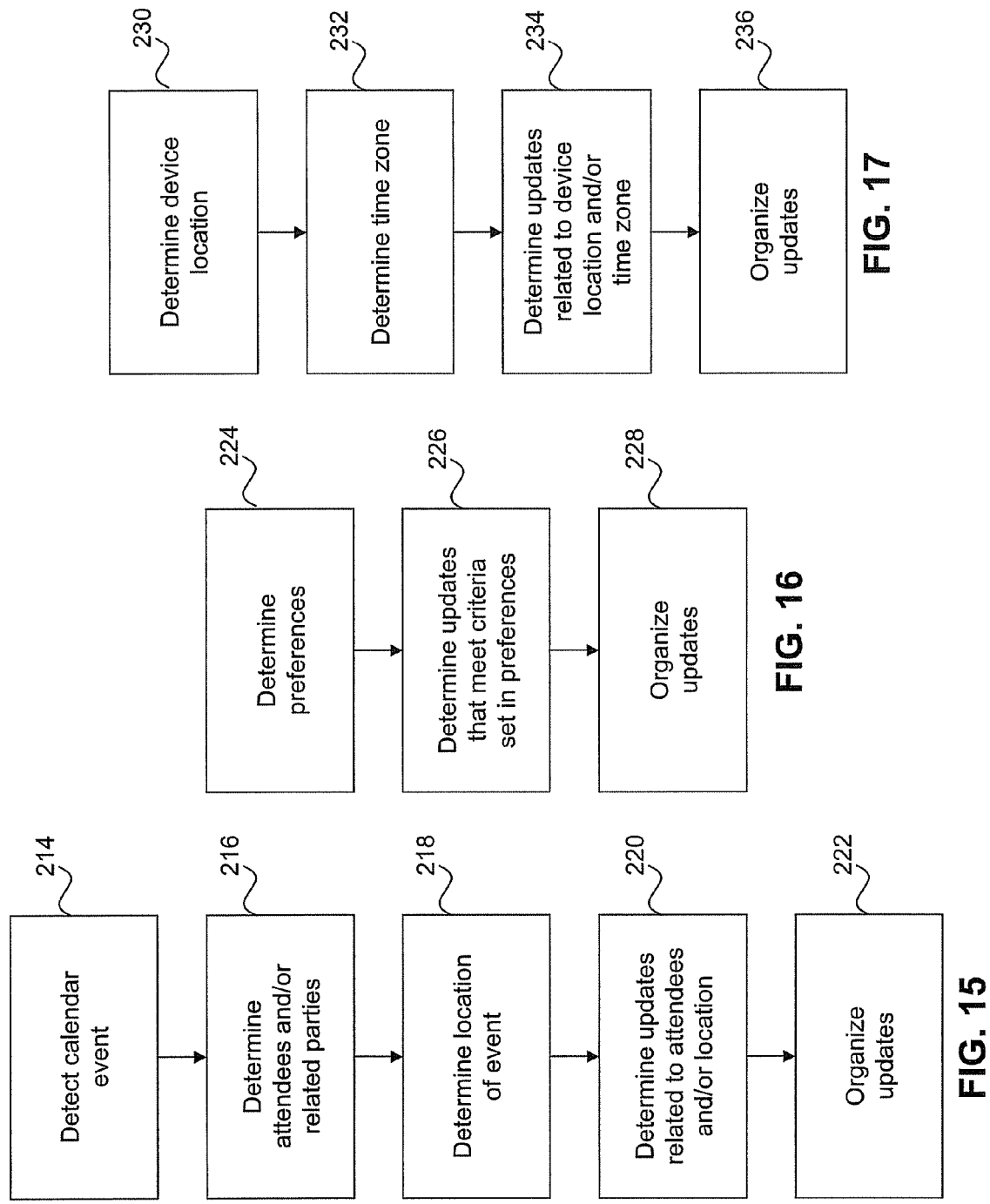

SYSTEM AND METHOD FOR CONTROLLING UPDATES ON A MOBILE DEVICE

TECHNICAL FIELD

The following relates to systems and methods for controlling updates on a mobile device.

BACKGROUND

Mobile communication devices are often used to communicate via several different media. For example, a smart phone or personal digital assistant (PDA) having wireless communication capabilities may be used to participate in cellular telephone conversations, to exchange email, to exchange SMS or multimedia messaging service (MMS) messages, to participate in instant messaging (IM) or other conversational type message exchanges, to post or receive social networking updates, receive data from web-based services, etc.

Often new incoming messages, data, or other events trigger or have associated therewith an update that is provided on the device to indicate to the user that something has happened. For example, a social media application may provide an update to the device when a friend has posted something to their account.

BRIEF DESCRIPTION OF THE DRAWINGS

Embodiments will now be described by way of example only with reference to the appended drawings wherein:

FIG. 1 is a block diagram of an example communication system comprising a plurality of sources providing updates to a mobile communication device.

FIG. 5 is a block diagram of another example configuration for organizing updates for a mobile communication device, wherein the organizing is performed at an intermediary.

FIG. 8 is a screen shot of an example GUI listing a number of organized updates, wherein relevant updates are displayed at the top of the list.

FIG. 9 is a screen shot of an example GUI listing a number of organized updates, wherein relevant updates are listed in one tab and the other updates listed in another tab.

FIG. 10 is a screen shot of an example GUI listing a number of organized updates, wherein relevant updates are shown with a link to access other updates below the relevant updates.

FIG. 11 is a screen shot of an example GUI listing a number of organized updates, wherein relevant updates are listed with a banner or ribbon link to other updates.

FIG. 12 is a screen shot of an example GUI listing a number of organized updates, wherein relevant updates are listed and other updates can be accessed via a menu.

FIG. 13 is a screen shot of an example GUI listing a number of organized updates, wherein a new relevant update has been received and displayed with other relevant updates.

FIG. 14 is a flow chart comprising an example set of computer executable instructions for organizing a number of updates provided to a mobile communication device.

FIG. 15 is a flow chart comprising an example set of computer executable instructions for performing the organizational logic operation shown in FIG. 14.

FIG. 16 is a flow chart comprising another example set of computer executable instructions for performing the organizational logic operation shown in FIG. 14.

FIG. 17 is a flow chart comprising yet another example set of computer executable instructions for performing the organizational logic operation shown in FIG. 14.

DETAILED DESCRIPTION OF THE DRAWINGS

Figure 3:
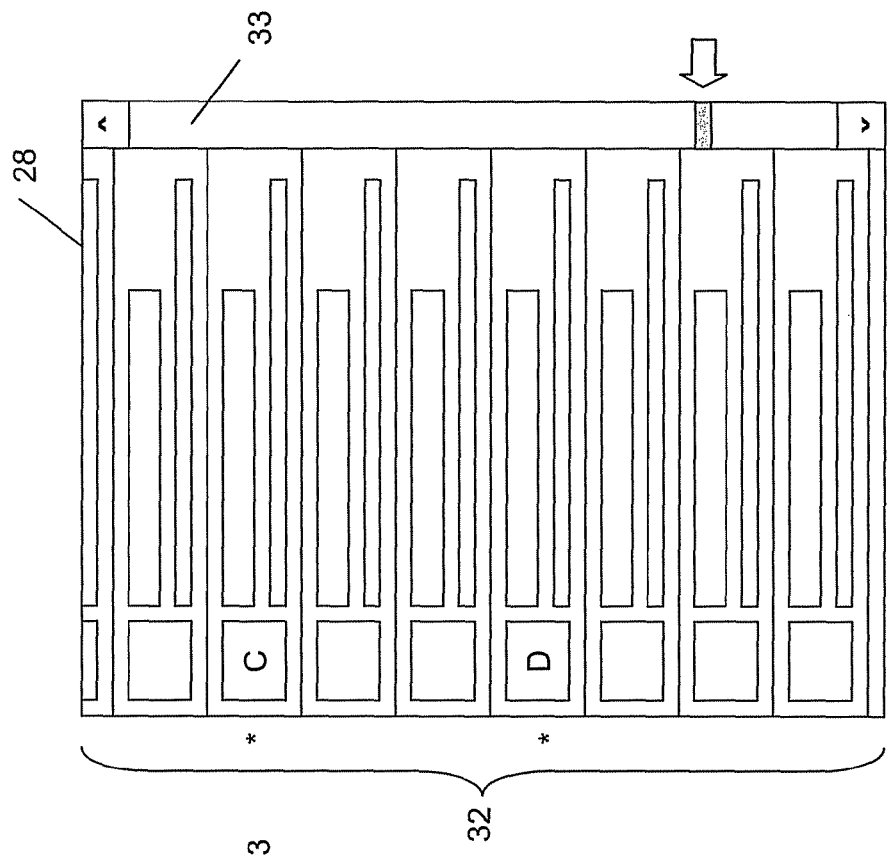
FIG. 3 is a screen shot of the example GUI of FIG. 2, displaying a number of updates further down the list.

It has been realized that as more and more applications and services are becoming available on electronic communication devices, so too are the number of updates that may be provided to the user at any given time, which can overwhelm the device display and may become burdensome to a user viewing the display. For example, the user may be required to scroll down through many updates in order to find one that is deemed to be particularly relevant.

To address these issues, the organization of the updates can be controlled according to something detectable on the mobile device which can be correlated to something detectable in the updates. For example, updates to be displayed on the mobile device can be organized based on context provided by the mobile device, such that more relevant updates are distinguishable from those that may be less relevant. In this way, all updates are accessible to the user, but those that are deemed to be particularly relevant may be more visible and more easily accessed to avoid the need to sort through or scroll through large lists of new updates.

Although the principles discussed below are applicable to any electronic communication device, examples will be provided for a mobile communication device, which is one of many types of electronic communication devices.

For clarity in the discussion below, mobile communication devices may be commonly referred to as "mobile devices" for brevity. Examples of applicable mobile devices include without limitation, cellular phones, smart-phones, wireless organizers, pagers, personal digital assistants, computers, laptops, handheld or other wireless communication devices, wirelessly enabled notebook computers, portable gaming devices, tablet computers, or any other portable electronic device with processing and communication capabilities.

FIG. 1 illustrates an example data communication system 8 comprising a mobile device 10 connectable to a wireless network 12. In this example, the mobile device 10 receives a variety of updates 14 from various sources 16. The sources 16 in this example include a social media server 18, a data communication server 20, and a presence server 22, e.g. for instant messaging. It can be appreciated that the sources 16 shown in FIG. 1 are not exhaustive and various other sources 16 of updates 14 associated with the mobile device 10 may be applicable.

As discussed above, as the number of applications and services for the mobile device 10 increase, the number of updates 14 provided to the mobile device 10 also increases. As shown in the example updates list GUI 28 of FIGS. 2 and 3, assuming Updates A, B, C, and D from a list of updates 32, are particularly relevant to the user at that time, it can be seen that the user would be required to scroll through the list of updates in order to find such relevant updates. As indicated by the leftward arrows showing the positioning of a scroll bar 33, in this example, Updates C and D are significantly separated from Updates A and B and would need to be distinguished from the other updates 14 in the list of updates 32. To avoid the need to perform such excessive searching/browsing/scrolling/navigating within the list of updates 32, the organization of the updates 14 can be controlled according to something detectable on the mobile device 10 which can be correlated to something detectable in the updates 14.

Figure 2:
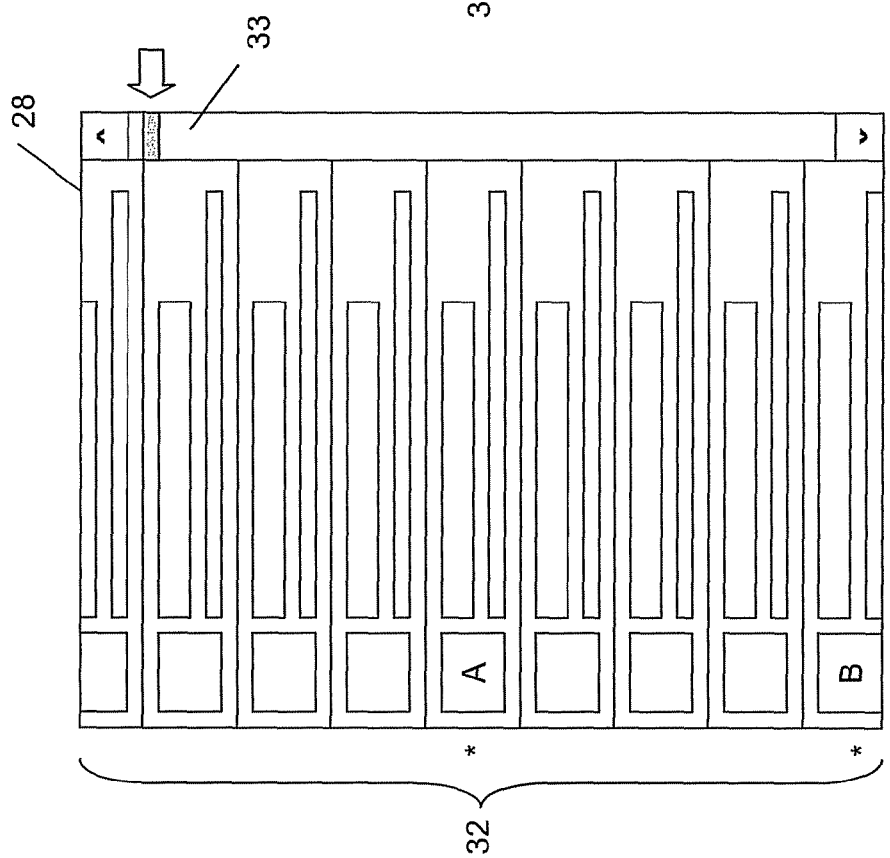
FIG. 2 is a screen shot of an example graphical user interface (GUI) listing a number of updates.
Figure 4:
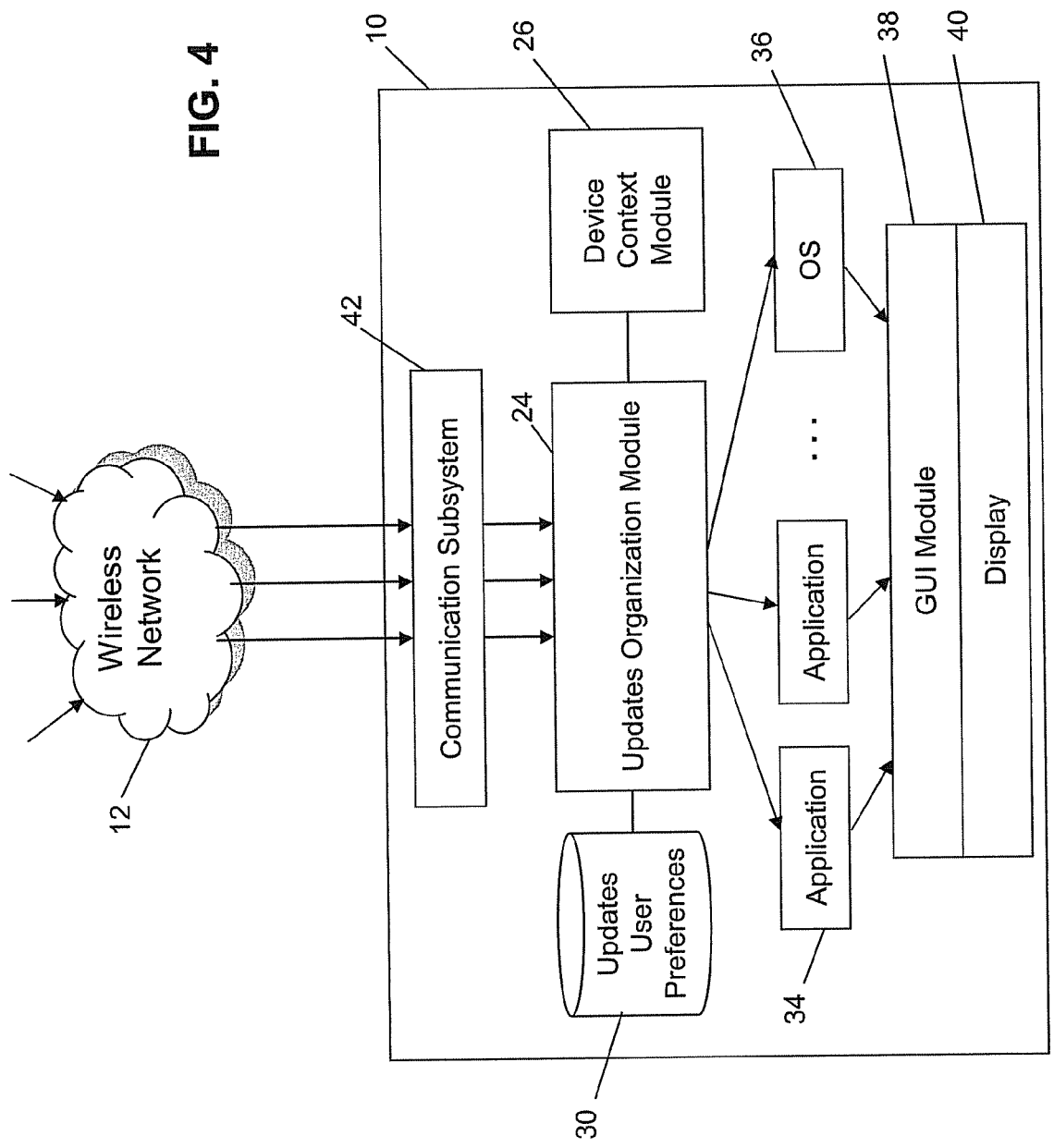
FIG. 4 is a block diagram of one example configuration for organizing updates for a mobile communication device.

Turning now to FIG. 4, an example configuration for the mobile device 10 is shown. In this example configuration, an updates organization module 24 is provided, which obtains updates 14 from the wireless network 12 via a communication subsystem 42, and prioritizes or otherwise organizes the updates 14 provided to particular applications 34 or the operating system (OS) 36, according to various criteria. It can be appreciated that multiple applications 34 and the OS 36 are shown in FIG. 2 to illustrate that the updates 14 may be used and displayed to the user in various forms, any of which may apply the principles discussed herein. For example, an updates application may be provided to show only updates 14, e.g. for social networking, a consolidated 'inbox' may show new email and text messages along with social media updates 14, a ribbon or other OS-controlled portion of the display may also display updates 14, etc. The updates 14 may then be displayed on a display 40 using a GUI module 38.

To detect something on the mobile device 10 which can be correlated to something detectable in the updates 14 on the mobile device 10, a device context module 26 is provided. The device context module 26 may be used to, for example, detect location, time of day, day of week, information or data in a data communication, calendar events, content being browsed, etc., to indicate to the updates organization module 24, what organizational logic should be used at that particular time. The updates organization module 24 may also refer to updates user preferences 30 in order to determine what logic to use. It can be appreciated that a combination of user preferences 30 and data obtained by the device context module 26 can also be used as will be shown below.

In some embodiments, the mobile device 10 may have access to or be otherwise connectable to a server device 41 over the network 12, as shown in FIG. 5. In such embodiments, the mobile device 10 can rely on the server device 41 to operate the updates organization module 24. In this way, the logic associated with organizing and prioritizing updates 14 can be done off of the mobile device 10 to thereby minimize the processing burden. By providing user profile data 46 and context data 44 to the server device 41, e.g. periodically, the server device 41 can determine from the incoming updates 14, an organization or priority, which can be conveyed to the mobile device 10 using organized updates data 42 as shown in FIG. 5. It can be appreciated that the organized updates data 42 may comprise the actual updates 14, in an organized form, or may simply provide an organization schema that enables the mobile device 10 to rearrange updates 14 sent to them (shown in dashed lines) to minimize changes to existing infrastructure (e.g. if the mobile device 10 should also know the order in which the updates 14 arrived).

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, one of its components, etc., or accessible or connectable thereto. Any application or module herein described may be implemented using computer readable/executable instructions that may be stored or otherwise held by such computer readable media.

Figure 7:
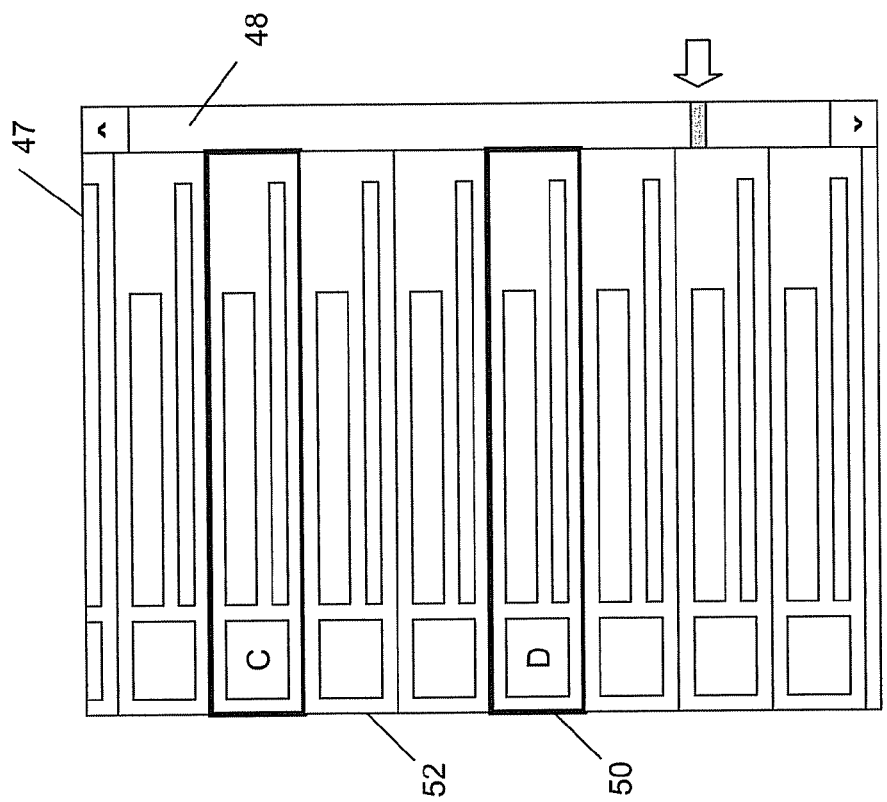
FIGS. 6 and 7 are screen shots of an example GUI listing a number of organized updates, wherein relevant updates are highlighted in the list.
Figure 6:
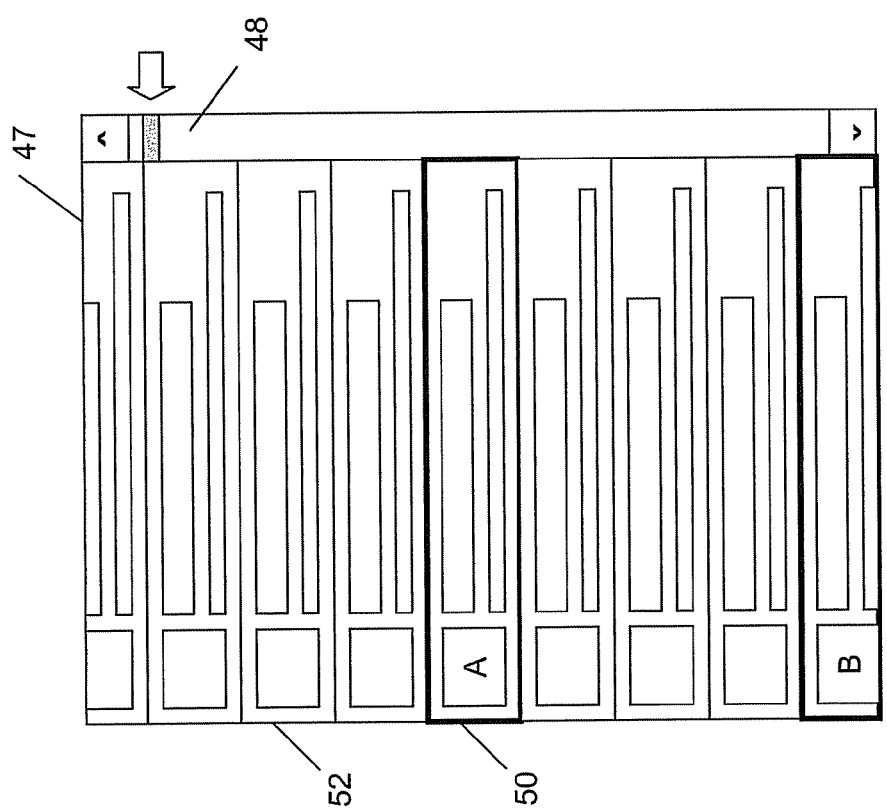

Turning now to FIGS. 6 through 13, example screen shots are provided illustrating example organizational schemas for organizing updates 14 for display on the mobile device 10. In FIGS. 6 and 7, an updates GUI 47 is shown, wherein the ordering of the updates 14 is unchanged, but relevant updates 50 are highlighted (as shown with bold outline) to draw attention to the relevant updates 50 in comparison to "other" updates 52. In this way, as the list of updates 14 is navigated (e.g. by scrolling down the list using a scroll bar 48), attention can be drawn to particular updates 14 while maintaining the original ordering.

In FIG. 8, an updates GUI 49 is shown wherein a relevant updates list 54 is distinct from another updates list 56. It can be appreciated that the bold outlining of the relevant updates is for illustrative purposes only and other ways of separating the lists 54, 56 may be used, e.g. a bold horizontal line (not shown), etc. In the example shown in FIG. 8, the updates 14 deemed particularly relevant at that time are prioritized over other updates and the ordering organized such that the relevant updates 14 are shown near the top of the GUI 49 to minimize scrolling or other navigating required to browse through the list of updates 14.

FIG. 9 illustrates yet another embodiment of an updates GUI 57, wherein the relevant updates list 54 is separated from the other updates list 56 using a tabbed interface, namely comprising a first tab 58 for the relevant updates list 54 and a second tab 60 for the other updates list 56. In this example, although the relevant updates list 54 is highlighted by separating it in a tab, by selecting the second tab 60, the other updates can be readily accessed through the same interface on the same screen.

Instead of using tabbed lists as shown in FIG. 9, a link 64 may be placed after the relevant updates list 54 as shown in the updates GUI 62 of FIG. 10. By selecting the link 64, another screen (not shown) may be displayed with the other updates list 56, the original ordering can be restored, the tabbed interface initiated, etc. In a variation of the updates GUI 66, shown in FIG. 11, a ribbon link 68 is provided to maintain the prominence of the link 68, e.g. to avoid it being hidden if the relevant updates list 54 extends beyond a single screen.

The list of relevant updates 54 can also be displayed in the updates GUI 70 as a filtered list as shown in FIG. 12, with the ability to restore the updates list or go to the other updates list 56 by invoking a menu 72. In this example, the other updates list 56 can be obtained by selecting a Go to Other Updates option 74 from the menu 72.

It can be appreciated that the examples shown in FIGS. 6 through 12 may be dynamically updated such that new updates are displayed in either the organized updates list 54 or with the other updates list 56. FIG. 13 illustrates an example updates GUI 76, in which a new update 80 arrives (in this example Update E), which is deemed to be relevant. It is then displayed in a revised list of relevant updates 78 thereby pushing the other updates further down the list. It can also be appreciated that updating or refreshing the updates GUI 76 can be performed through invocation of a refresh option (not shown), can be triggered by each new update 14 received, or may be performed periodically by the mobile device 10. Also shown in FIG. 13 is a re-ordering within the relevant updates list 78. This allows organized results to then be prioritized, e.g. based on user preferences 30 such as user type (friend, co-worker, family, etc.).

In order to organize the updates 14 as shown in the above examples, organization logic or schemas can be utilized by the mobile device 10 based on user preferences 30, logic determined based on data provided by the device context module 26, or both. Turning now to FIG. 14, an example set of computer executable instructions are shown, which may be executed by the mobile device 10 (e.g. using the updates organization module 24), in order to organize updates 14 received by the mobile device 10. At 200, updates 14 are obtained, e.g. received at the mobile device 10 or at the server device 41, or both. At 202, it is determined whether or not the updates 14 should be organized, which operation may or may not be used. For example, the determination at 202 can rely on device activity or perceived user interactions (e.g. scrolling, typing, eye-movements, backlight, etc.) to determine whether there is a need to organize the updates 14. In this way, only if the user is actually using the mobile device 10 does the organization of updates 14 need to be performed, thus potentially reducing the processing burden on the mobile device 10 or the server device 41 or both. Similarly, user preferences can be used to determine under what circumstances organization of the updates 14 is to be applied. For example, a user preference may indicate that updates are to be organized for the user only in the evenings and on weekend as that is when they are most likely to view the updates 14. This can be particularly advantageous wherein updates 14 relate to social networking services that are more likely to be used (or use thereof controlled) during work or school hours. It can be appreciated however that operation 202 does not need to be performed, i.e. the mobile device 10 may be operable to always organize updates 14.

If the updates 14 are not to be organized, the updates 14 are provided as they arrive at 204, and the updates are displayed at 206. If however, the updates 14 are to be organized, the organizational logic is determined at 208, and the updates 14 organized accordingly at 210. The organized updates are then provided at 212, and the updates 14, thus organized, displayed at 206.

The organizational logic determined at 208 can be determined in various ways such that in general something detected on the mobile device 10 can be correlated to something detectable in the updates 14 in order to determine its relevance. One example is shown in FIG. 15, wherein a calendar event is detected at 214. In this example, upon detecting the calendar event, the device context module 26 then determines the attendees and/or related parties associated with the calendar event at 216 and determines the location of the event at 218. The relevant updates are then selected by determining if the updates relate to one of the attendees or related parties or relate to the location at which the event is being held at 220. The relevant updates are then organized at 222, e.g. as shown in FIGS. 6 through 13. By detecting information related to the calendar event, updates 14 such as messages from the attendees, traffic or weather or sports news related to the location of the event, among other things can be deemed relevant.

Another example is shown in FIG. 16, wherein user preferences 30 are relied upon as the detectable information on the mobile device 10 to provide a "static" set of criteria which to correlate to the updates 14. The user preferences 30 in this example are determined at 224, the updates 14 meeting the criteria set forth by the user preferences 30 are determined at 226 and the updates organized at 228. It can be appreciated that the user preferences can include any criterion, rule or mapping that enables the updates organization module 24 to sort through the various updates 14. For example, user preferences can organize based on who or what is associated with the update (origin, sender, etc.), based on the source 16 (e.g. allow email but block social networking), based on topic, etc. As will be discussed below, the user preferences 30 may also be used in conjunction with other data detected on the mobile device 10 in order to determine which of the preferences should be applied.

FIG. 17 illustrates yet another example, wherein the location of the mobile device 10 is used to organize the updates 14. The location is determined at 230, and from this, the time zone determined at 232. The updates related to the device location and/or the time zone may then be determined at 234, and the relevant updates organized at 236. By determining time zone, as shown in this example, updates related to users that are geographically separated can be filtered out of the relevant updates list 54, e.g. since the associated users are likely not actually available at that time or are too far away to permit socializing.

Figure 18:
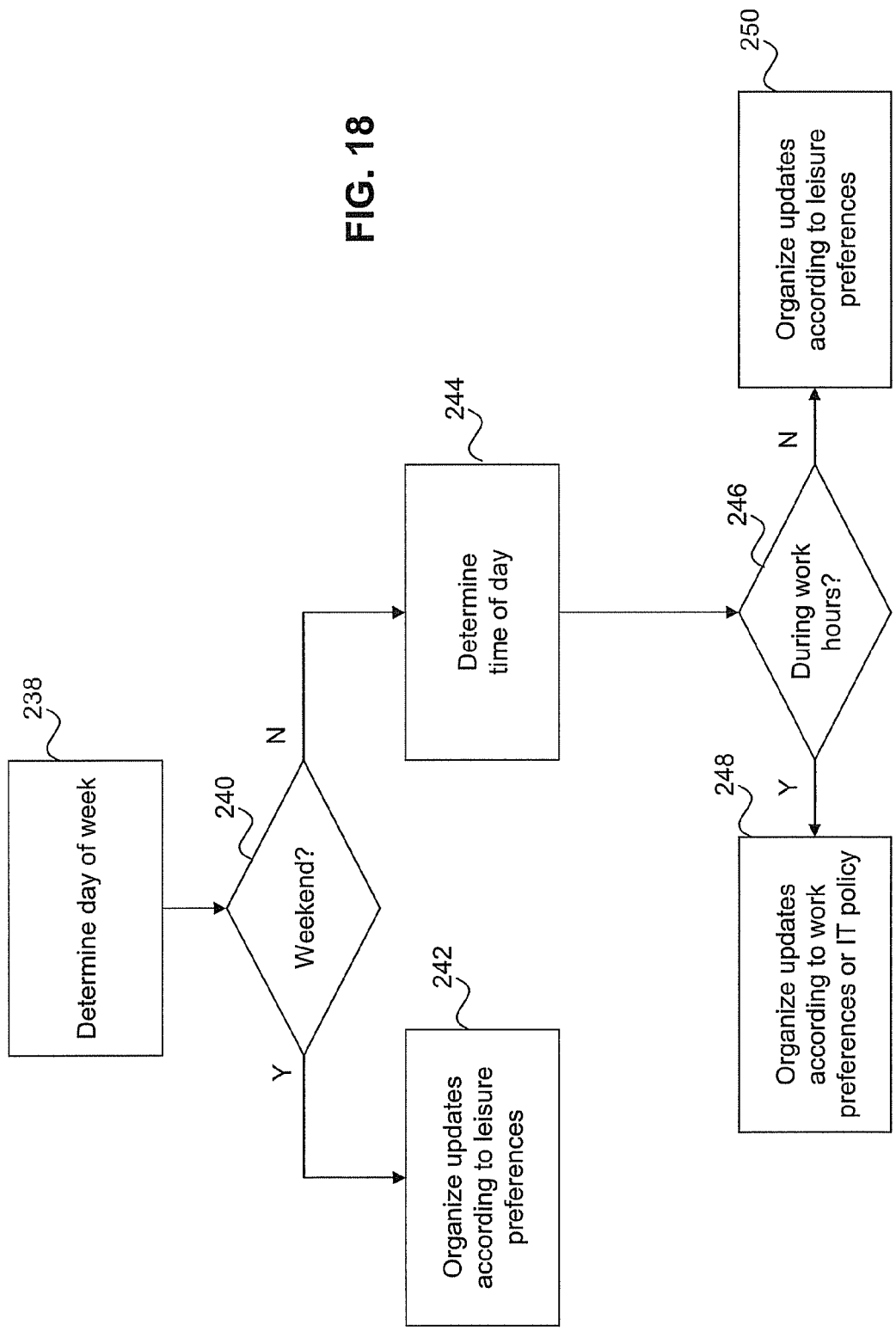
FIG. 18 is a flow chart comprising yet another example set of computer executable instructions for performing the organizational logic operation shown in FIG. 14.

FIG. 18 illustrates an example wherein different user preferences 30 can be selected based on device context data such as the time of day and day of week. At 238, the day of week is determined. If it is determined at 240 that the current day is on a weekend, a set of leisure preferences can be applied at 242. If however the current day is not on a weekend, the time of day is then determined at 244. At 246, it is then determined if the current time is during working hours (such working hours being user defined, IT policy defined, default, etc.). If the current time is during working hours, a set of work preferences or an IT policy can be used to organize the updates. For example, project related updates can be prioritized during work hours with social-related updates placed in the other updates list 56 for later viewing. By applying an IT policy, other entities which have some control over the device usage can enforce use of the updates organization module 24 to minimize distractions caused by personal updates 14. If the current time is determined to be outside of working hours, the updates can be organized according to the leisure preferences at 250.

It can therefore be seen that user preferences can be mixed with context data detected on the mobile device 10 in order to vary the type of organization schema to be used at a particular time.

Figure 19:
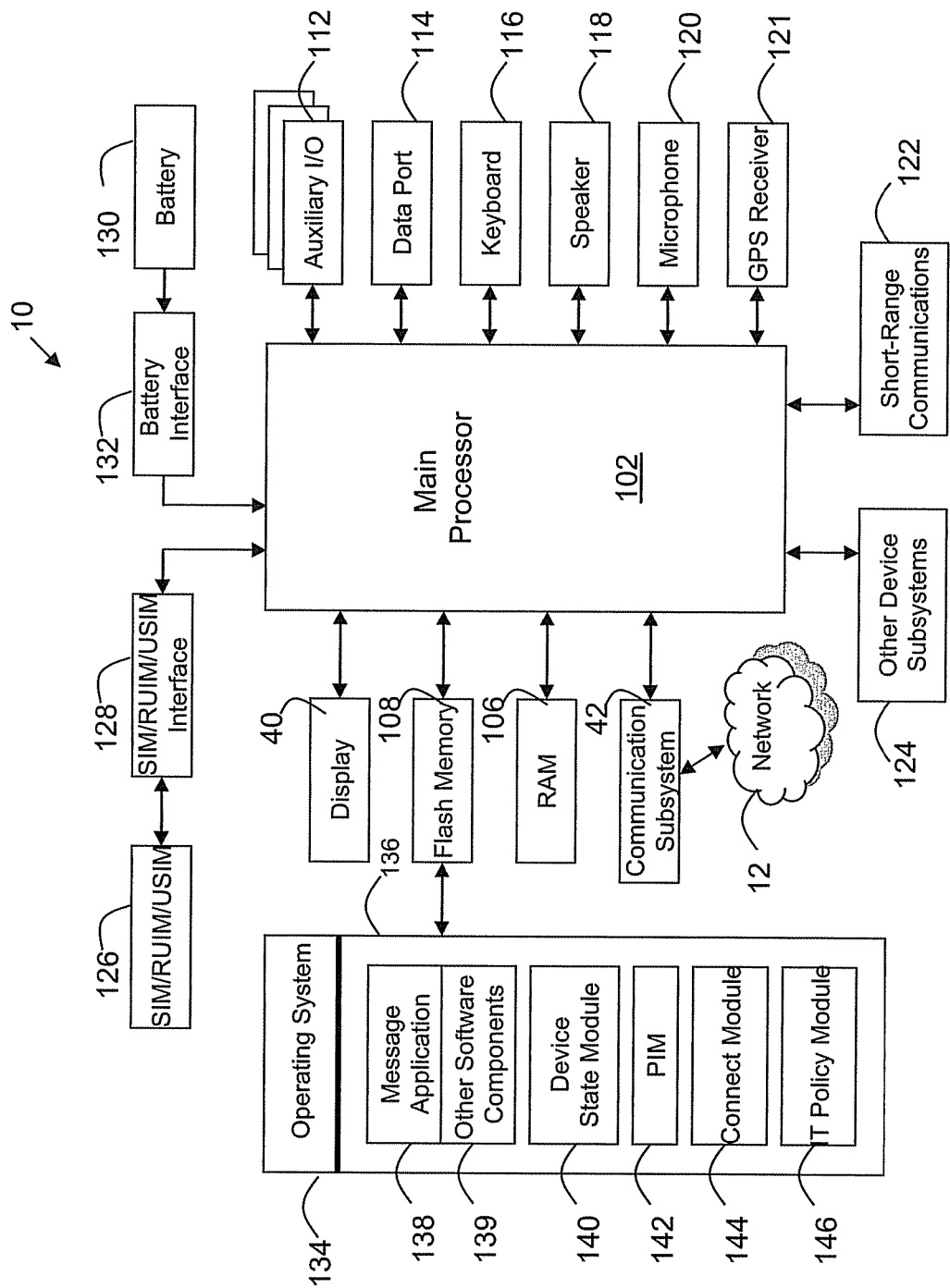
FIG. 19 is a block diagram of an example configuration for a mobile communication device.

Referring now to FIG. 19, shown therein is a block diagram of an exemplary embodiment of a mobile device 10. The mobile device 10 comprises a number of components such as a main processor 102 that controls the overall operation of the mobile device 10. Communication functions, including data and voice communications, are performed through a communication subsystem 42. The communication subsystem 42 receives messages from and sends messages to a wireless network 12. In this example embodiment of the mobile device 10, the communication subsystem 42 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 42 with the wireless network 12 represents one or more different Radio Frequency (RF) channels, operating according to defined protocols specified for GSM/GPRS communications. With newer network protocols, these channels are capable of supporting both circuit switched voice communications and packet switched data communications.

The main processor 102 also interacts with additional subsystems such as a Random Access Memory (RAM) 106, a flash memory 108, a display 40, an auxiliary input/output (I/O) subsystem 112, a data port 114, a keyboard 116, a speaker 118, a microphone 120, GPS receiver 121, short-range communications 122 and other device subsystems 124.

Some of the subsystems of the mobile device 10 perform communication-related functions, whereas other subsystems may provide "resident" or on-device functions. By way of example, the display 40 and the keyboard 116 may be used for both communication-related functions, such as entering a text message for transmission over the network 12, and device-resident functions such as a calculator or task list.

The mobile device 10 can send and receive communication signals over the wireless network 12 after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 126 is to be inserted into a SIM/RUIM/USIM interface 128 in order to communicate with a network. The SIM/RUIM/USIM component 126 is one type of a conventional "smart card" that can be used to identify a subscriber of the mobile device 10 and to personalize the mobile device 10, among other things. Without the component 126, the mobile device 10 may not be fully operational for communication with the wireless network 12. By inserting the SIM/RUIM/USIM 126 into the SIM/RUIM/USIM interface 128, a subscriber can access all subscribed services. Services may include: web browsing and messaging such as e-mail, voice mail, SMS, and MMS. More advanced services may include: point of sale, field service and sales force automation. The SIM/RUIM/USIM 126 includes a processor and memory for storing information. Once the SIM/RUIM/USIM 126 is inserted into the SIM/RUIM/USIM interface 128, it is coupled to the main processor 102. In order to identify the subscriber, the SIM/RUIM/USIM 126 can include some user parameters such as an International Mobile Subscriber Identity (IMSI). An advantage of using the SIM/RUIM/USIM 126 is that a subscriber is not necessarily bound by any single physical mobile device. The SIM/RUIM/USIM 126 may store additional subscriber information for a mobile device as well, including datebook (or calendar) information and recent call information. Alternatively, user identification information can also be programmed into the flash memory 108.

The mobile device 10 is typically a battery-powered device and includes a battery interface 132 for receiving one or more batteries 130 (typically rechargeable). In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Other software applications include a message application 138 that can be any suitable software program that allows a user of the mobile device 10 to send and receive electronic messages. Various alternatives exist for the message application 138 as is well known to those skilled in the art. Messages that have been sent or received by the user are typically stored in the flash memory 108 of the mobile device 10 or some other suitable storage element in the mobile device 10. In at least some embodiments, some of the sent and received messages may be stored remotely from the mobile device 10 such as in a data store of an associated host system that the mobile device 10 communicates with.

The software applications can further comprise a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 10 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 12. PIM data items may be seamlessly integrated, synchronized, and updated via the wireless network 12 with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

The mobile device 10 may also comprise a connect module 144, and an IT policy module 146. The connect module 144 implements the communication protocols that are required for the mobile device 10 to communicate with the wireless infrastructure and any host system, such as an enterprise system, that the mobile device 10 is authorized to interface with.

The connect module 144 includes a set of APIs that can be integrated with the mobile device 10 to allow the mobile device 10 to use any number of services associated with the enterprise system. The connect module 144 allows the mobile device 10 to establish an end-to-end secure, authenticated communication pipe with a host system (not shown). A subset of applications for which access is provided by the connect module 144 can be used to pass IT policy commands from the host system to the mobile device 10. This can be done in a wireless or wired manner. These instructions can then be passed to the IT policy module 146 to modify the configuration of the device 10. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 10. Applications for which the IT policy may be applicable then respond by reading the IT policy data to look for IT policy rules that are applicable.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc.

The additional applications 139 can be loaded onto the mobile device 10 through at least one of the wireless network 12, the auxiliary I/O subsystem 112, the data port 114, the short-range communications subsystem 122, or any other suitable device subsystem 124. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 114 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

The short-range communications subsystem 122 provides for communication between the mobile device 10 and different systems or devices, without the use of the wireless network 12. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 42 and input to the main processor 102. The main processor 102 may then process the received signal for output to the display 40 or alternatively to the auxiliary I/O subsystem 112. A subscriber may also compose data items, such as e-mail messages, for example, using the keyboard 116 in conjunction with the display 40 and possibly the auxiliary I/O subsystem 112. The auxiliary subsystem 112 may comprise devices such as: a touch screen, mouse, track ball, infrared fingerprint detector, or a roller wheel with dynamic button pressing capability. The keyboard 116 is an alphanumeric keyboard and/or telephone-type keypad. However, other types of keyboards may also be used. A composed item may be transmitted over the wireless network 12 through the communication subsystem 42.

For voice communications, the overall operation of the mobile device 10 in this example is substantially similar, except that the received signals are output to the speaker 118, and signals for transmission are generated by the microphone 120. Alternative voice or audio I/O subsystems, such as a voice message recording subsystem, can also be implemented on the mobile device 10. Although voice or audio signal output is accomplished primarily through the speaker 118, the display 40 can also be used to provide additional information such as the identity of a calling party, duration of a voice call, or other voice call related information.

Although the above has been described with reference to certain specific embodiments, various modifications thereof will be apparent to those skilled in the art without departing from the scope of the claims appended hereto.

The invention claimed is:

1. A method of displaying notifications for at least one of messaging and social networking applications used by an electronic communication device, the notifications being triggered by events related to one or more communication applications used by the electronic communication device, the method comprising:

receiving plurality of notification messages comprising a plurality of notifications for the one or more social networking communication applications on the electronic communication device from at least one communication server, the plurality of notifications being triggered by events related to at least one corresponding communication application used by at least one other device and being detected by the at least one communication server;

generating a list of the plurality of notifications in a user interface;

determining, at a present time, a present context of the electronic communications device, the context having at least one attribute being related to the present time, wherein the present context comprises a notification of an upcoming calendar event, the upcoming calendar event indicating at least one of related parties associated with the upcoming calendar event and at least one attendee of the calendar event;

after determining that the list of the plurality of notifications should be organized based on at least one of detected user activity on the electronic device and the present time:

identifying a correlation between data within at least one notification within the plurality of notifications and the present context existing at the present time, wherein the identifying a correlation comprises identifying the at least one notification within the plurality of notifications that are related to the at least one of the related parties and the at least one attendee;

modifying, based on the identifying, the user interface to display only the at least one notification of the plurality of notifications in the user interface; and providing an input mechanism in the user interface, which when selected displays other notifications within the plurality of notifications in the user interface.

2. The method according to claim 1, wherein the modifying is further based on prioritizing a notification associated with a particular sender.

3. The method according to claim 1, wherein the present context comprises a notification of an upcoming calendar event, the upcoming calendar event indicating a location associated with the calendar event, and wherein the identifying a correlation comprises identifying the at least one notification within the plurality of notifications that are notifications associated with the location.

4. The method according to claim 1, wherein the at least one of the plurality of notifications comprises notifications associated with a location, and wherein the identifying the correlation is based on a relationship between the location and a determined location of the electronic communication device.

5. The method according to claim 1, further comprising determining a current time of day and day of week, and wherein the at least one of the plurality of notifications comprises notifications prioritized according to their content and the current time of day and day of week.

6. The method according to claim 1, further comprising determining one or more user preferences, and wherein the at least one of the plurality of notifications comprises notifications prioritized according to the one or more user preferences.

7. The method according to claim 1, further comprising:
receiving at least one new notification; and
dynamically updating the list to include the at least one new notification with the at least one of the plurality of notifications of the others of the plurality of notifications based on a correlation between data within the at least one new notification and the present context existing at the present time.

8. The method according to claim 1, wherein the receiving and identifying are performed on a server in a data communication system connectable to the electronic communication device.

9. An electronic communication device configured for displaying notifications for at least one of messaging and social networking applications used by an electronic communication device, the notifications being triggered by events related to one or more communication applications used by the electronic communication device, the electronic communication device comprising a processor and memory, the memory storing computer executable instructions that when executed by the processor, operate the electronic communication device for:
receiving plurality of notification messages comprising a plurality of notifications for one or more social networking communication applications on the electronic communication device from at least one communication server, the plurality of notifications being triggered by events related to at least one corresponding communication application used by at least one other device and being detected by the at least one communication server;
generating a list of the plurality of notifications in a user interface;
determining, at a present time, a present context of the electronic communications device, the context having at least one attribute being related to the present time, wherein the present context comprises a notification of an upcoming calendar event, the upcoming calendar event indicating at least one of related parties associated with the upcoming calendar event and at least one attendee of the calendar event;
after determining that the list of the plurality of notifications should be organized based on at least one of detected user activity on the electronic device and the present time:
identifying a correlation between data within at least one notification within the plurality of notifications and the present context existing at the present time, wherein the identifying a correlation comprises identifying the at least one notification within the plurality of notifications that are related to the at least oen of the related parties and the at least one attendee;
modifying, based on the identifying, the user interface to display only the at least one notification of the plurality of notifications in the user interface; and
providing an input mechanism in the user interface, which when selected displays other notifications within the plurality of notifications in the user interface.

10. A non-transitory computer readable storage medium for displaying notifications for at least one of messaging and social networking applications used by an electronic communication device, the notifications being triggered by events related to one or more communication applications used by the electronic communication device, the non-transitory computer readable medium comprising computer executable instructions that when executed by an electronic communication device, operate the electronic communication device for:
receiving plurality of notification messages comprising a plurality of notifications for the one or more communication applications on the electronic communication device from at least one communication server, the plurality of notifications being triggered by events related to at least one corresponding communication application used by at least one other device and being detected by the at least one communication server;
generating a list of the plurality of notifications in a user interface;
determining, at a present time, a present context of the electronic communications device, the context having at least one attribute being related to the present time, wherein the present context comprises a notification of an upcoming calendar event, the upcoming calendar event indicating at least one of related parties associated with the upcoming calendar event and at least one attendee of the calendar event;
after determining that the list of the plurality of notifications should be organized based on at least one of detected user activity on the electronic device and the present time:
identifying a correlation between data within at least one notification within the plurality of notifications and the present context existing at the present time, wherein the identifying a correlation comprises identifying the at least one notification within the plurality of notifications that are related to the at least one of the related parties and the at least one attendee;
modifying, based on the identifying, the user interface to display only the at least one notification of the plurality of notifications in the user interface; and
providing an input mechanism in the user interface, which when selected displays other notifications within the plurality of notifications in the user interface.

11. The non-transitory computer readable storage medium according to claim 10, wherein the present context comprises a notification of an upcoming calendar event, the upcoming calendar event indicating a location associated with the calendar event, and wherein the identifying a correlation comprises identifying the at least one notification within the plurality of notifications that are notifications associated with the location.

12. The non-transitory computer readable storage medium according to claim 10, wherein the at least one of the plurality of notifications comprises notifications associated with a location, and wherein the identifying the correlation is based on a relationship between the location and a determined location of the electronic communication device.

13. The non-transitory computer readable storage medium according to claim 10, further comprising instructions for determining a current time of day and day of week, and wherein the at least one of the plurality of notifications comprises notifications prioritized according to their content and the current time of day and day of week.

14. The non-transitory computer readable storage medium according to claim 10, further comprising instructions for determining one or more user preferences, and wherein the at least one of the plurality of notifications comprises notifications prioritized according to the one or more user preferences.

15. The non-transitory computer readable storage medium according to claim 10, further comprising instructions for:
receiving at least one new notification; and
dynamically updating the list to include the at least one new notification with the at least one of the plurality of notifications of the others of the plurality of notifications based on a correlation between data within the at least one new notification and the present context existing at the present time.

16. The non-transitory computer readable storage medium according to claim 10, wherein the receiving and identifying are performed on a server in a data communication system connectable to the electronic communication device.

17. The non-transitory computer readable storage medium according to claim 10, wherein the modifying is further based on prioritizing a notification associated with a particular sender.

18. The method according to claim 1, further comprising:
storing user preferences comprising a respective specification of at least one criterion of interest during a work period and a respective specification at least one criterion of interest during intervals outside the work period; and
determining if the present time is one of within a work period and within an interval outside the work period,
wherein the present context comprises the present time being one of within a work period and within an interval outside the work period,
wherein the identifying a correlation comprises identifying the at least one notification within the plurality of notifications that satisfy, based on determining the present time is within the work period, the respective specification of the at least one criterion of interest during the work period, and
wherein the identifying a correlation comprises identifying the at least one notification within the plurality of notifications that satisfy, based on determining the present time is within an interval outside the work period, a respective specification at least one criterion of interest during intervals outside the work period.

19. The method according to claim 1, further comprising:
detecting the user activity on the electronic device based on receiving user inputs to the device, and
wherein at least the identifying a correlation and the modifying the user interface is based on detecting the user activity.

\* \* \* \* \*